United States Patent [19]
Cornacchia et al.

[11] Patent Number: 5,056,860
[45] Date of Patent: Oct. 15, 1991

[54] HIGH-PERFORMANCE MOTOR CAR

[75] Inventors: Felice Cornacchia; Nevio Di Giusto, both of Torino, Italy

[73] Assignee: Fiat Auto S.p.A., Torino, Italy

[21] Appl. No.: 504,827

[22] Filed: Apr. 5, 1990

[30] Foreign Application Priority Data

Apr. 6, 1989 [IT] Italy .............................. 67246 A/89

[51] Int. Cl.⁵ ............................................ B62D 35/00
[52] U.S. Cl. .................. 296/180.5; 280/762; 296/185
[58] Field of Search ................. 296/180.1, 180.5, 185; 280/762, 810; 180/2.1, 2.2; 114/43, 272; 244/2; D12/88, 86, 91, 90

[56] References Cited
U.S. PATENT DOCUMENTS

| D. 74,498 | 2/1928 | Gerin | 296/185 |
| 1,523,263 | 6/1925 | Henninger | 296/185 |
| 3,804,428 | 4/1974 | Amick | 296/180.5 |
| 4,881,701 | 11/1989 | Bullard | 244/2 |

Primary Examiner—Andres Kashnikow
Assistant Examiner—Eric Culbreth
Attorney, Agent, or Firm—Sughrue, Mion, Zinn, Macpeak & Seas

[57] ABSTRACT

A high-performance motor car includes a body which surrounds the rear wheels and has a tapered front part from which the front steerable wheels project. The front wheels are inserted in respective aerodynamic fairings which can be steered with the wheels. A vertical fin is pivoted to the rear of each fairing.

2 Claims, 2 Drawing Sheets

HIGH-PERFORMANCE MOTOR CAR

BACKGROUND OF THE INVENTION

The present invention relates in general to performance

In conventional cars, unlike "formula" cars, the rear wheels and the front wheels are enclosed by the body or bodywork of the car.

This means that, in practice, it is impossible for the driver visually to check the behaviour of the front steerable wheels of the car, which limits the speed and performance of such cars on bends.

SUMMARY OF THE INVENTION

The object of the invention is to avoid this problem and to propose a performance motor car of the above type having architecture such as to enable the driver visually to determine the steering angle of the front wheels, whilst remaining within the conditions imposed by the regulations.

According to the invention, this object is achieved by means of a performance motor car, characterised in that it includes a body which surrounds the rear wheels and has a tapered front part from which the front steerable wheels project, the front wheels being inserted in respective aerodynamic fairings which can be steered together with the wheels.

Each of the fairings conveniently has a movable, vertical, fin-like rear part which can be moved as a result of the pivoting of the respective fairing, in the opposite sense from the latter.

BRIEF DESCRIPTION OF THE DRAWINGS

The invention will now be described in detail with reference to the appended drawings, provided purely by way of non-limiting example, in which.

DETAILED DESCRIPTION OF THE INVENTION

Figure 1:
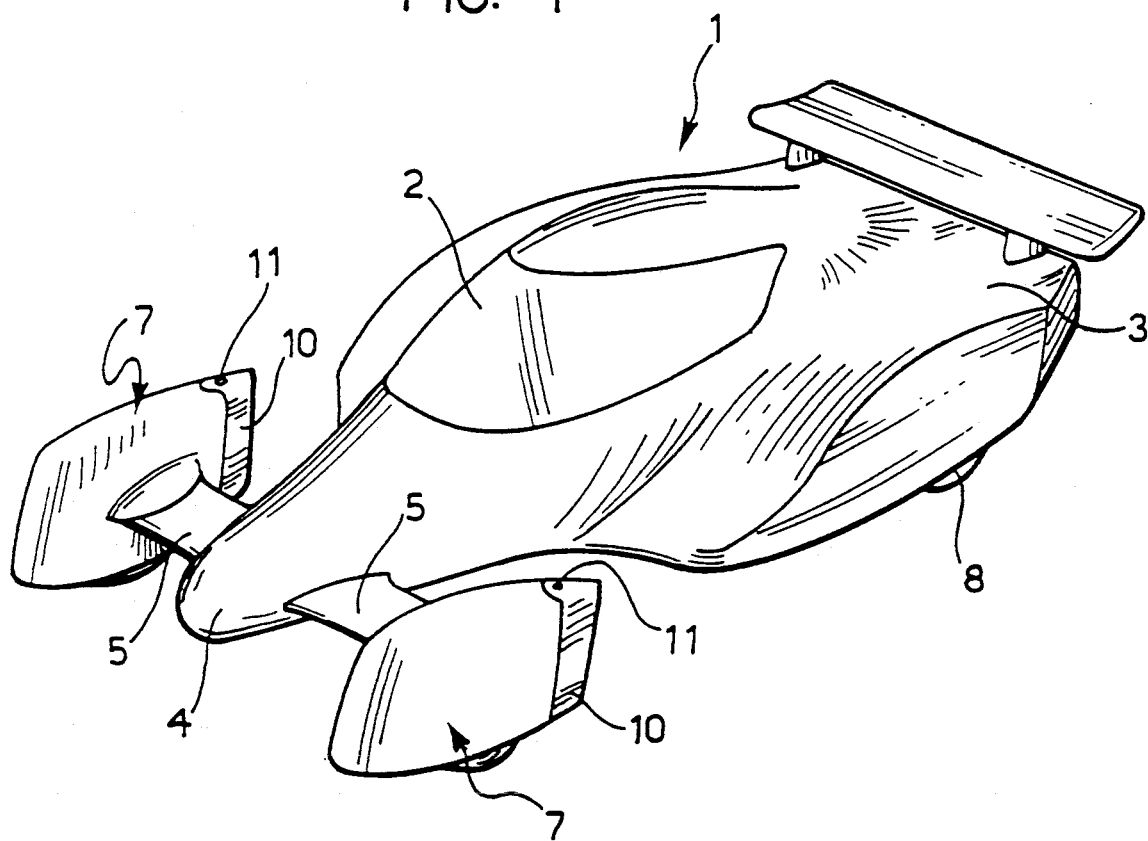
FIG. 1 is a schematic perspective view of a performance car according to the invention, FIG. 2 a side elevation of the car.
Figure 2:
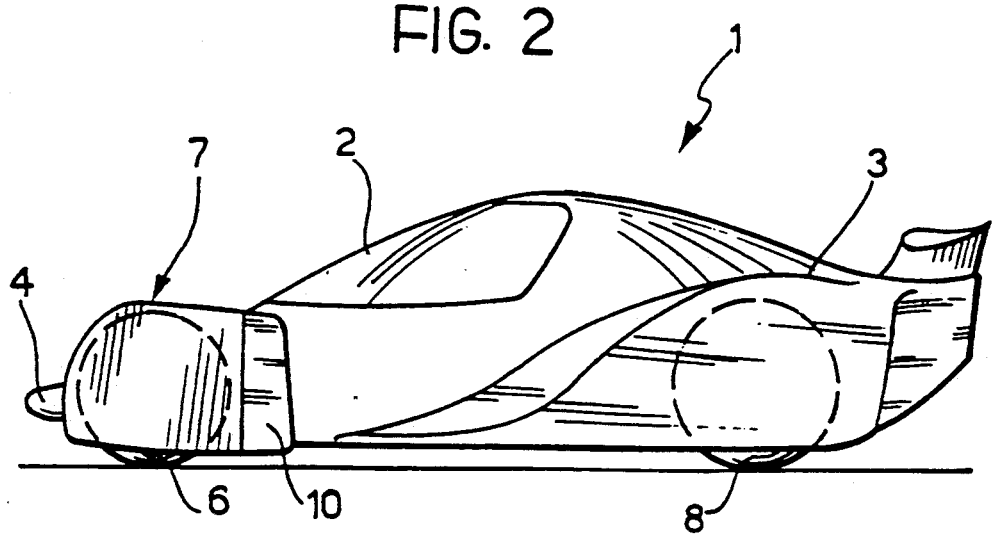
Figure 3:
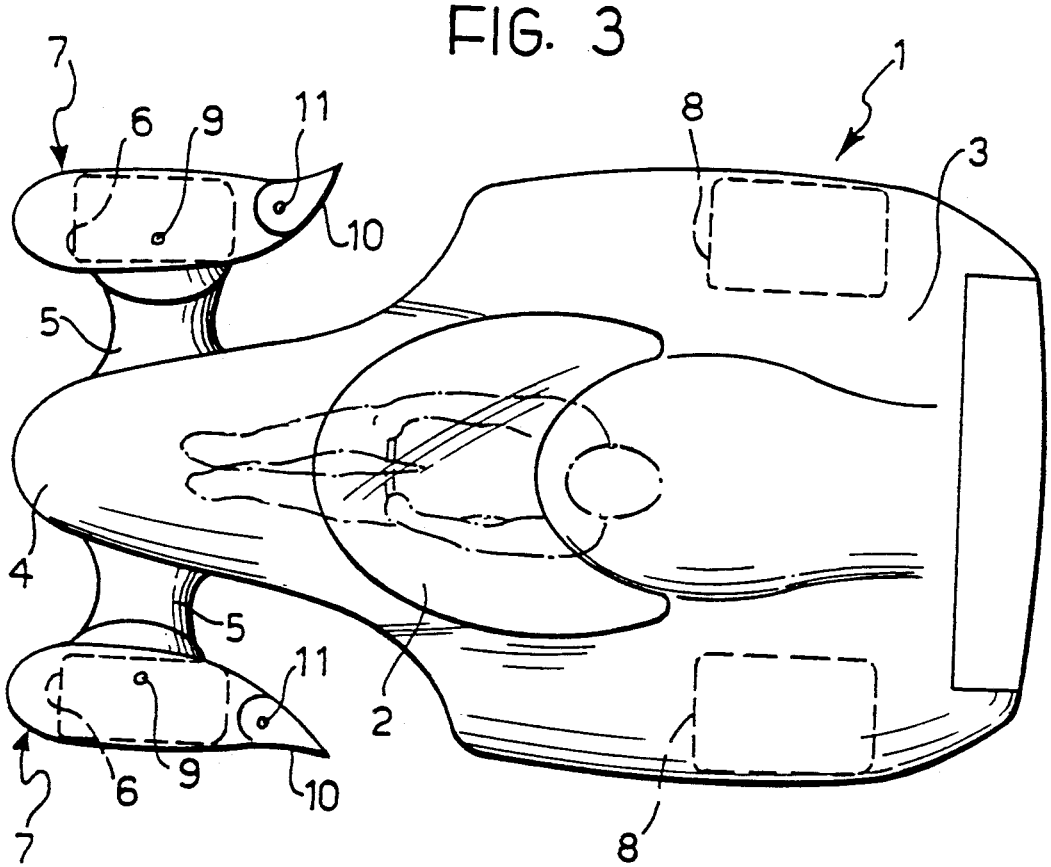
FIG. 3 is a plan view of the car from above.
Figure 4:
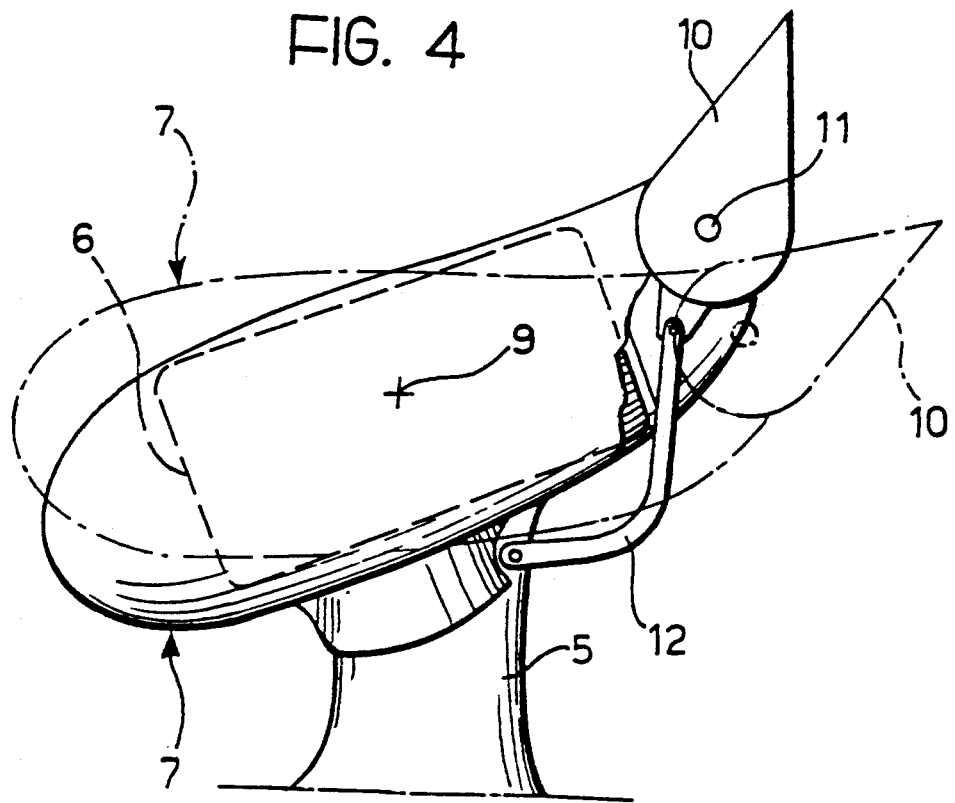
FIG. 4 shows a detail of FIG. 3 on an enlarged scale.

With reference to the drawings, the performance car according to the invention has a body or bodywork, generally indicated 1, defining a central passenger compartment 2 and having a rear part 3 formed so as to surround the rear wheels 8, which are normally the driving wheels. The body 1 has a slender, tapered front part 4, near the end region of which project two aerodynamic side appendages 5 which, as well as defining a front spoiler also enclose the kinematic steering and suspension mechanisms of the front steerable wheels 6 of the car. These steerable wheels 6 are enclosed in two aerodynamic fairings 7 which are pivotable relative to the two side appendages 5 about respective, substantially vertical axes 9. The fairings 7 are pivoted simultaneously with the steering of the front wheels 6. The articulated connections of the fairings 7 or the side wings 5 and the respective means for making them pivot are not shown in detail, since they can be achieved by arrangements within the capabilities of the expert in the art.

The pivoting of the fairings 7 enables the driver visually to determine the angular position of the front wheels 6 during steering, whilst he is driving the vehicle, ensuring more precise steering on bends and enabling maximum use to be made of the speed performance of the vehicle.

According to the preferred embodiment of the invention shown in the drawings, each fairing 7 has a movable, fin-like, rear part 10 which is pivotable relative to the fairing 7 about a substantially vertical axis 11. The arrangement is such that, when the two fairings 7 pivot with the front wheels 6 in one sense (that is, towards the inside of the bend), the two fins 10 are pivoted in the opposite sense (that is, towards the outside of the bend). This can be achieved simply by means of tie rods 12 which connect the front edge of each fin 10 to the respective fairing 7 in a region spaced from its pivot axis 9.

The two fins 10 modify the aerodynamic profiles of the respective fairings 7 during steering, so as to make use of the speed of the vehicle to increase the aerodynamic lift of the fairings towards the inside of the bend and thus compensate for any understeering.

We claim:

1. A high performance motor car comprising:
   a body, rear wheels and front steering wheels, said body surrounding said rear wheels and having a tapered front part,
   supporting means pivotally supporting said front steering wheels on opposite sides of said tapered front part,
   aerodynamic fairings surrounding said front wheels and mounted for pivotal steering movement with said front wheels,
   a movable, vertical, fin-like member pivotally mounted on each fairing adjacent a rear portion thereof and
   connecting means for pivoting said fin-like member in opposite direction to the pivotal movement of each fairing.

2. A motor car according to claim 1, wherein said supporting means is comprises of two aerodynamic side appendages extending from opposite sides of said front part of the body to define a front spoiler with said fairings being pivotally mounted at outer ends of said appendages.

* * * * *